Patented Sept. 17, 1935

2,014,536

UNITED STATES PATENT OFFICE 2,014,536

PRODUCTION OF NITROGEN-FREE ALKALI METAL CARBONATES

Robert B. MacMullin and George Lewis Cunningham, Niagara Falls, N. Y., assignors to The Mathieson Alkali Works, Inc., New York, N. Y., a corporation of Virginia No Drawing. Application April 21, 1932, Serial No. 606,760

2 Claims. (Cl. 23—63)

This invention relates to the production of nitrogen-free anhydrous sodium carbonate, sodium carbonate monohydrate and sodium sesquicarbonate from sodium ammonium carbonate dihydrate.

Sodium ammonium carbonate dihydrate, $$NaNH_4CO_3 \cdot 2H_2O$$

and the production of this compound is described in an application filed by Robert B. MacMullin on March 21, 1932, and issued as Patent No. 1,980,691 on Nov. 13, 1934.

We have discovered that sodium ammonium carbonate dihydrate can be converted to nitrogen-free sodium carbonates by heating to temperatures upwards of about 50° C. to drive off ammonia, carbon dioxide and water. While water is driven off during the conversion, its presence, as water of hydration of the sodium ammonium carbonate, appears to be important in the requisite elimination particularly of nitrogen as ammonia. The sodium carbonates so produced are substantially free from nitrogen compounds such as cyanates, cyanides, carbamates, ammonia and ammonium carbonates. By controlling the temperature of heating, various sodium carbonates can be produced.

In the production of anhydrous sodium carbonate, $Na_2CO_3$, the sodium ammonium carbonate dihydrate is heated to a temperature upwards of about 104° C. The reaction may be illustrated as follows:

$$2(NaNH_4CO_3 \cdot 2H_2O) = Na_2CO_3 + 2NH_3 + CO_2 + 5H_2O$$

The reaction is substantially complete at temperatures approximating 150° C.

In the production of sodium carbonate monohydrate, $Na_2CO_3 \cdot H_2O$, the sodium ammonium carbonate dihydrate is heated to a temperature approximating 50–104° C. The reaction may be illustrated as follows:

$$2(NaNH_4CO_3 \cdot 2H_2O) = Na_2CO_3 \cdot H_2O + 2NH_3 + CO_2 + 4H_2O$$

In the production of sodium sesquicarbonate dihydrate, $$NaHCO_3 \cdot Na_2CO_3 \cdot 2H_2O,$$

the sodium ammonium carbonate dihydrate is heated to a temperature approximating 50° C. The reaction may be illustrated as follows:

$$3(NaNH_4CO_3 \cdot 2H_2O) = NaHCO_3 \cdot Na_2CO_3 \cdot 2H_2O + 3NH_3 + CO_2 + 5H_2O$$

We claim:

1. In the production of sodium carbonate monohydrate from sodium ammonium carbonate dihydrate, the improvement which comprises heating the latter compound to a temperature approximating 50–104° C.

2. In the production of sodium sesquicarbonate dihydrate from sodium ammonium carbonate dihydrate, the improvement which comprises heating the latter compound to a temperature approximating 50° C.

ROBERT B. MacMULLIN.
GEORGE LEWIS CUNNINGHAM.